(12) United States Patent
Tian et al.

(10) Patent No.: US 6,873,701 B1
(45) Date of Patent: Mar. 29, 2005

(54) SYSTEM AND METHOD FOR DTMF DETECTION USING LIKELIHOOD RATIOS

(75) Inventors: Wenshun Tian, Rolling Meadows, IL (US); Youhong Lu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 917 days.

(21) Appl. No.: 09/821,409

(22) Filed: Mar. 29, 2001

(51) Int. Cl.[7] .............................................. H04M 1/50
(52) U.S. Cl. ...................... 379/386; 379/283; 370/526; 708/312
(58) Field of Search ................................ 379/283, 386; 370/526; 708/311, 312; 702/75, 76; 704/219

(56) References Cited

U.S. PATENT DOCUMENTS

| | | | |
|---|---|---|---|
| 4,689,760 A | 8/1987 | Lee et al. ................. | 370/110.3 |
| 4,853,958 A | 8/1989 | Rabipour et al. ........... | 379/386 |
| 5,459,784 A | 10/1995 | Tzeng .......................... | 379/386 |
| 5,765,125 A | * 6/1998 | Daugherty et al. ......... | 370/526 |

OTHER PUBLICATIONS

Gunter Schmer, "*DTMF Tone Generation And Detection: An Implementation Using The TMS320C54x*", Texas Instruments, May 2000, pp. 1–19.

* cited by examiner

*Primary Examiner*—Forester W. Isen
*Assistant Examiner*—Daniel Swerdlow
(74) *Attorney, Agent, or Firm*—McDonnell Boehnen Hulbert & Berghoff LLP

(57) ABSTRACT

A system and method for determining DTMF coefficients stores a plurality of reference templates, at least some of said reference templates representative of likelihood ratios. A plurality of LPC coefficients is received. The LPC coefficients are representative of an input signal. The system and method determines a plurality of current likelihood ratios based, at least in part, upon the LPC coefficients. The system and method also determines an initial tone based, at least in part, on the minimum of the current likelihood ratios and the minimum of the reference likelihood ratios. A plurality of LSF coefficients is received. The LSF coefficients are determined, at least in part, upon the input signal. The system and method verifies the validity of the initial tone based, at least in part, upon the LSF coefficients.

18 Claims, 4 Drawing Sheets

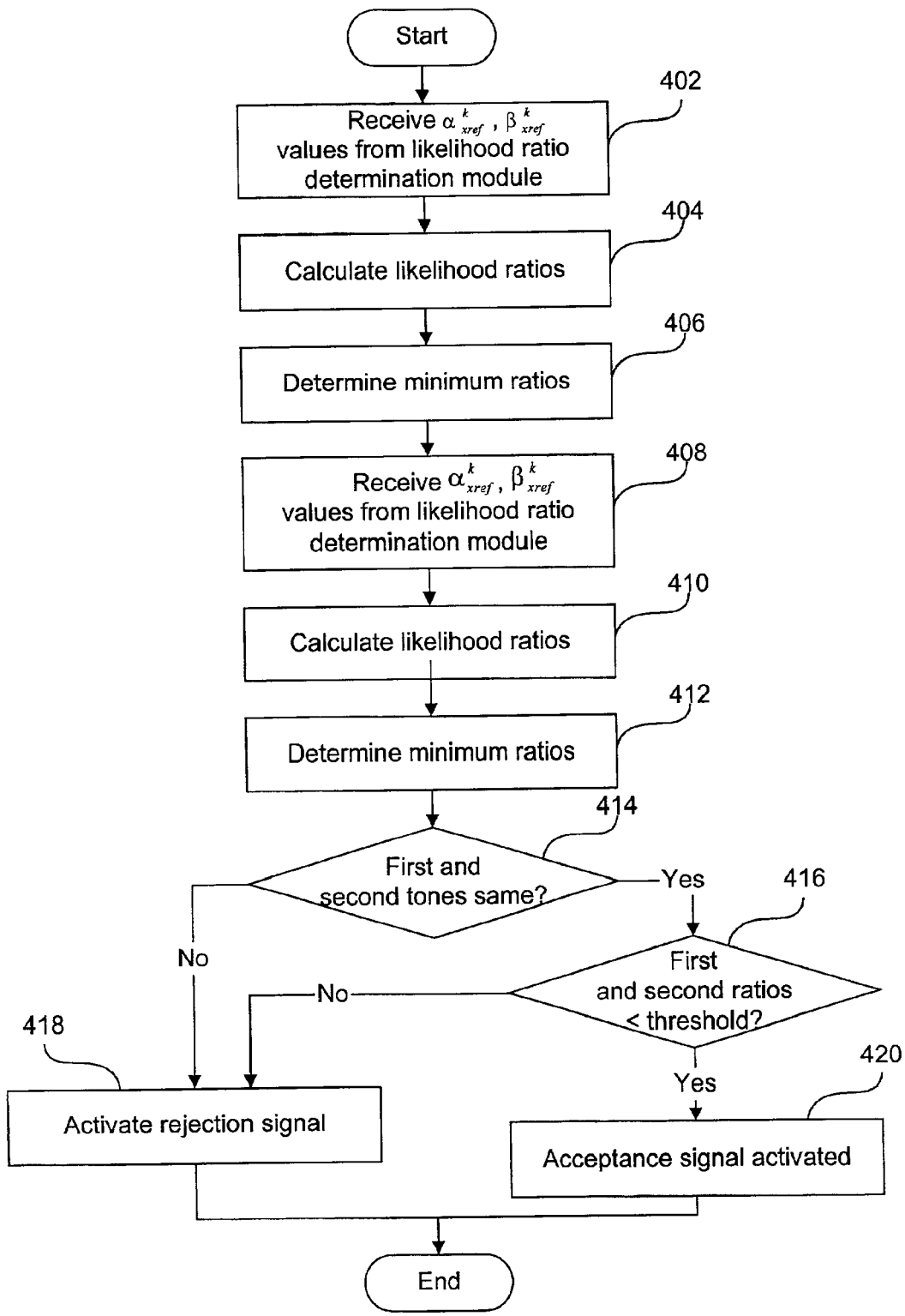

SYSTEM AND METHOD FOR DTMF DETECTION USING LIKELIHOOD RATIOS

FIELD OF THE INVENTION

This present invention relates to methods and devices that detect DTMF tones. In particular, the invention relates to using cost functions to detect DTMF tones.

BACKGROUND OF THE INVENTION

Dual Tone Multi-Frequency (DTMF) detectors have become widely used in the telecommunication industry. DTMF signals include two tones, one from a row group of frequencies and one from a column group of other frequencies. A pair of frequencies (one from the row and one from the column) determine a symbol. In one illustrative example, four frequencies may be selected for the row group and four frequencies may be selected for the column group. Sixteen pairs can be created from this grouping and can represent sixteen symbols, for instance, 1, 2, 3, 4, 5, 6, 7, 8, 9, 0, a, b, c, d, *, and #. The row frequencies may be 697 Hz, 770 Hz, 852 Hz, and 941 Hz. The column frequencies may be 1209 Hz, 1336 Hz, 1477 Hz, and 1633 Hz.

Devices in modern telecommunication systems may use several different methods to detect DTMF tones. For example, one technique uses discrete Fourier transforms (DTFs) to detect DTMF tones. Specifically, the DTF values at only the tone frequencies are computed as specified in a modified Goertzel algorithm. Although this technique may detect the DTMF tones, it has certain limitations. For instance, the technique depends upon the use of finely tuned thresholds and, therefore, may have variations depending upon different operating environments.

SUMMARY OF THE INVENTION

The system and method of the present invention advantageously determines the DTMF tones present in an input signal using likelihood ratios. After an initial determination of a tone is made, the system and method of the present invention uses LSF coefficients, which may be calculated from the input signal, to verify that the initial determination of the tone was correct.

In one embodiment of the present invention, a system for determining a DTMF tone includes an auto-correlation module, a LPC analysis module, a likelihood ratio determination module, a database, a pattern matching module, a tone acceptance module, and a LSF analysis module. The auto-correlation module is coupled to the database, the likelihood ratio determination module, and the LPC analysis module. The LPC analysis module is coupled to the LSF analysis module and the likelihood ratio determination module. The LSF analysis module is coupled to the tone acceptance module. The pattern-matching module is coupled to the tone acceptance module and the likelihood ratio determination module.

The auto-correlation module may determine a plurality of auto-correlates for an input signal, which it receives. The LPC analysis module may determine a plurality of LPC coefficients from the plurality of auto-correlates, which are determined by the auto-correlation module. The likelihood ratio determination module may determine a plurality of current likelihood ratios of the plurality of LPC coefficients, which are determined by the LPC analysis module.

The database may store a plurality of reference auto-correlates and LPC coefficient correlates of normal DTMF tones. The reference auto-correlates and LPC coefficient correlates of normal DTMF tones may be pre-calculated and trained using normal DTMF tone signals. The pattern matching module may determine an initial tone pair, at least in part, by determining the minimum of the plurality of current likelihood ratios and the minimum of the plurality of reference likelihood ratios. The LSF analysis module, may determine a plurality of LSF coefficients from the plurality of LPC coefficients produced by the LPC analysis module. The tone acceptance module may receive the initial tone pair from the pattern-matching module and verify the validity of this initial tone pair using the LSF coefficients.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein:

FIG. 4 shows a flowchart of the operation of a pattern-matching module in accordance with a preferred embodiment of the present invention.

DETAILED DESCRIPTION OF PREFERRED EMBODIMENTS

Figure 1:
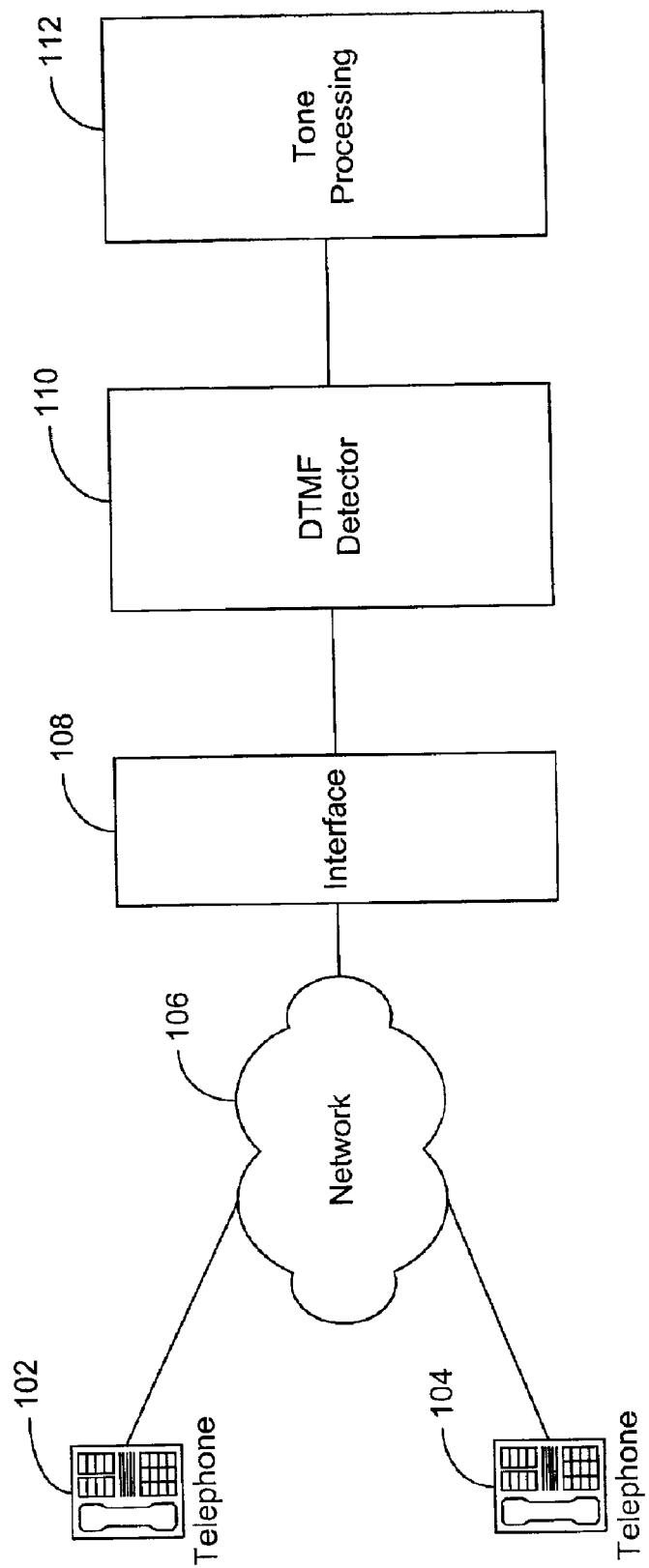
FIG. 1 is a diagram illustrating a preferred embodiment of the system for detecting DTMF tones in accordance with the present invention.

Referring now to FIG. 1, user devices 102 and 104 are coupled to a network 106. The network 106 is coupled to an interface 108. The interface 108 is coupled to a DTMF detector 110. The DTMF detector 110 is coupled to a tone-processing module 112.

The user devices 102 and 104 may be any types of device that is used to transmit any type of information including DTMF tones. For example, the user devices 102 and 104 may be conventional telephones. However, other examples of user devices are possible.

The network 106 may be any type of network that is used to transmit any type of information. For example, the network 106 may be the Public Switched Telephone Network (PSTN). The network 106 may also be a combination of networks, for instance, a wireless and landline network. The network 106 may contain all the functionality needed to route information from a source to a destination including, for example, switches and routers.

The interface 108 may be any type of device used to perform any conversion processes that are needed between the network 106 and the DTMF detector 110. For example, the interface 108 may convert analog signals received from the network 106 into digital signals for processing by the DTMF detector 110. Other types of conversion processes or no conversion process are also possible.

The DTMF detector 110 may receive signals from the interface 108 and may determine the DTMF tones in the signals using the method and system described in this specification. The DTMF detector 110 may send the DTMF tone, which the DTMF detector may determine, to the tone-processing module 112.

The tone-processing module 112 may be any type of signal processing system. For example, the tone-processing module 112 may be a voice messaging system, a system for switching voice messages, or any system that requires the detection of tone signals. Other types of processing systems are possible.

In operation, the user devices 102 and 104 may generate signals, which include DTMF tones. For example, if the user devices 102 and 104 are telephones, DTMF tones may be generated when the user presses a key on the keypad of the telephone. The DTMF tones are passed via the network 106 to the interface 108. The interface 108 performs any conversions that are needed. For example, if the DTMF tones are in an analog form, the interface 108 may convert the signals into a digital format. The DTMF detector 110 may then determine the tone using the method and system described in this specification. Upon detection of the tone, the information concerning the tone is sent to the tone-processing module 112. The tone-processing module 112 may use this information to perform messaging functions. For example, messaging functions may include the remote access of voice mail. Other examples are also possible.

Figure 2:
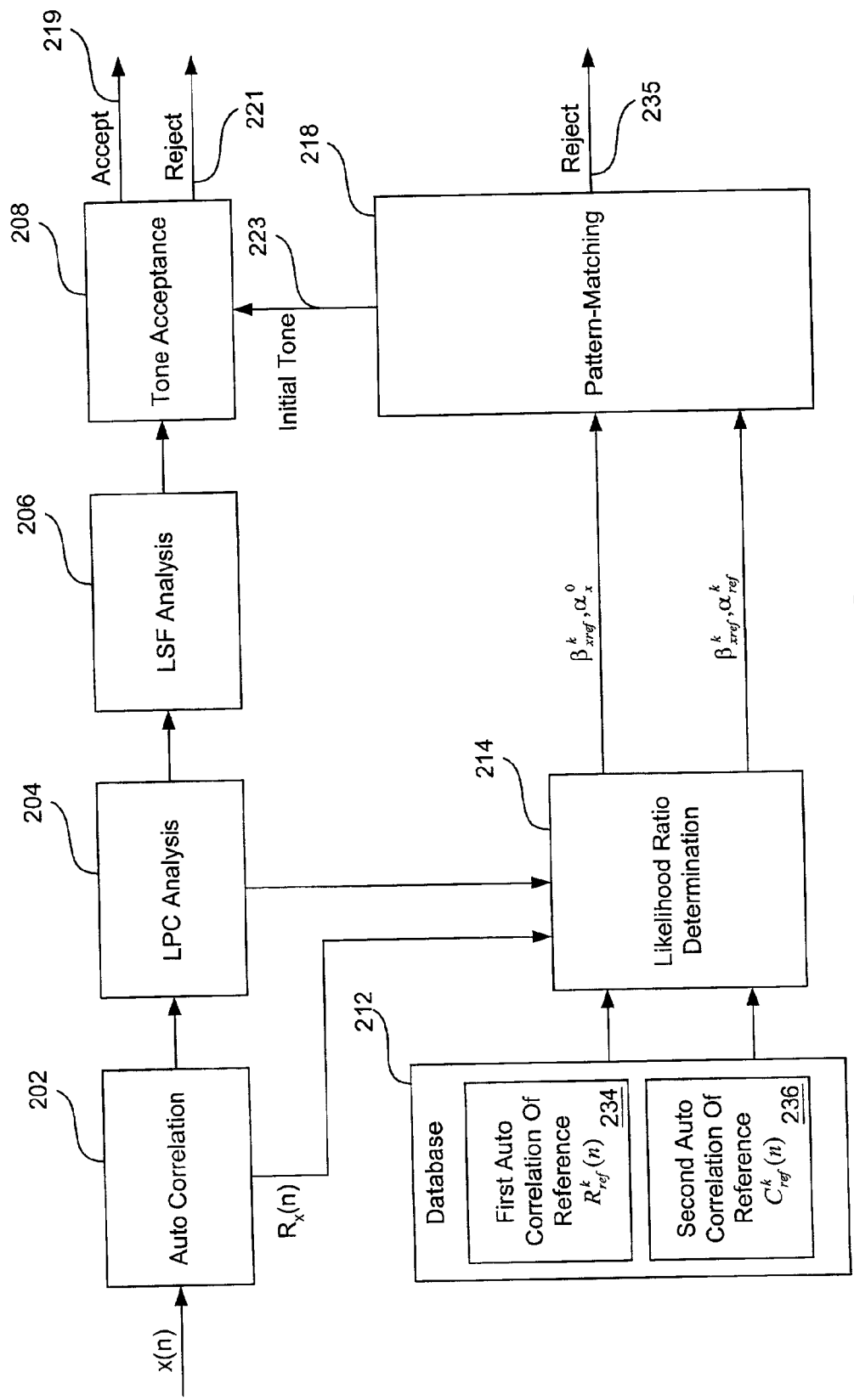
FIG. 2 is a diagram illustrating a DTMF detector in accordance with a preferred embodiment of the present invention.

Referring now to FIG. 2, a system for determining DTMF tones includes an auto-correlation module 202, a LPC analysis module 204, a Linear Spectral Frequency (LSF) analysis module 206, a tone acceptance module 208, a database 212, a likelihood ratio determination module 214, and a pattern matching module 218. The auto-correlation module 202 is coupled to the LPC analysis module 204 and the likelihood ratio determination module 214. The LPC analysis module 204 is coupled to the LSF analysis module 206 and the likelihood ratio determination module 214. The LSF analysis module 206 is coupled to the tone acceptance module 208. The database 212 is coupled to the likelihood ratio determination module 214 and the pattern-matching module 218. The pattern-matching module 218 is coupled to the tone acceptance module 208.

The functions of the auto-correlation module 202 may be implemented using a suitable combination of computer instructions stored in a memory and executed by a processor. The auto-correlation module 202 may calculate the auto-correlation $R_x(n)$ of the input signal $x(n)$. If the LPC order=P, the range of $\{n\}=\{0,1,\ldots P\}$, then:

$$R_x(n) = \sum_{j=0}^{L-n-1} x(j)x(n-j), \quad n = 0, 1, \ldots, P \quad (1)$$

where L is the LPC analysis frame length. Its typical value is 180 samples, for example.

The auto-correction $R_x(n)$ data may be fed to LPC analysis module 204 to calculate an LPC filter $A_x(z)$, for example, using Levinson-Durbin method.

The functions of the LPC analysis module 204 may be implemented using a suitable combination of computer instructions stored in a memory and executed by a processor. The LPC analysis module 204 may calculate a LPC synthesis filter $A_x(z)$ and generate LPC coefficients, which model the spectrum of the input signal. The synthesis filter may be given by:

$$A_x(z) = \frac{1}{1 - \sum_{i=1}^{P} a(i)z^{-i}} \quad (2)$$

If $x(n)$ is the input signal, then the LPC analysis module 204 may predict the sample using previous samples of the input signal $x(n)$. If $\hat{x}(n)$ is the predicted value of $x(n)$, then the prediction equation may be:

$$\hat{x}(n) = \sum_{k=1}^{L} a_k x(n-k) \quad (3)$$

where the coefficient $a_k$ is the prediction coefficients and L is the prediction order. For speech signals, L may be set to any convenient value, for example, 10. However, other values of the prediction order are possible.

In one example, if the input signal, $x(n)$, is a DTMF signal such that $$x(n) = A^*\sin(2^*\pi^*f_1/f_s) + B^*\sin(2^*\pi^*f_2/f_s) \quad (4)$$

where A and B are constant, $f_1$ is one of $\{697, 770, 852, 941$ Hz$\}$, $f_2$ is one of $\{1209, 1336, 1477, 1633$ Hz$\}$, and $f_s$ is the sampling frequency, then, the LPC coefficients may be given by:

$$a_1 = 2^*[\cos(2^*\pi^*f_1/f_s) + \cos(2^*\pi^*f_2/f_s)] \quad (5)$$

$$a_2 = -2^*[1 + 2^*\cos(2^*\pi^*f_1/f_s)^* \cos(2^*\pi^*f_2/f_s)] \quad (6)$$

$$a_3 = a_1 \quad (7)$$

$$a_4 = -1 \quad (8)$$

and $a_k = 0$ for k=5 to L.

The LPC coefficients may be computed based on current small block of samples, for example, using the Levinson-Durbin algorithm.

If DTMF detection is used in a system where there is a speech-coding algorithm based on analysis by synthesis principal, then above LPC analysis module 204 can be saved since it is a part of the speech-coding algorithm.

The LPC analysis 204 may also calculate the auto-correlations of the LPC coefficients $C_x(n)$, which may be used by likelihood ratio determination module 214. This $C_x(n)$ may be calculated using:

$$C_x(n) = \sum_{j=0}^{P-n} a(j)a(n-j), \quad n = 0, 1, \ldots, P \quad (9)$$

where $a(j)$ are LPC coefficients and $a(0)=1$.

The functions of the LSF analysis module 206 may be implemented by a suitable combination of computer instructions stored in a memory and executed by a processor. The LSF analysis module 206 converts the parameters from the LPC domain to the LSF domain, for example, by taking LSF transforms of LPC coefficients. The transforms compose the all-pole synthesis filter $A_x(z)$ and reflect the root of this all-pole filter $A_x(z)$. If tones are present in the input signal, the peaks will be around the roots of $A_x(z)$ which are around the frequencies of the tone.

The specific method to calculate LSF coefficients from LPC coefficients may be any suitable method, for example, the method described by A. M. Kondoz in "Digital Speech Coding for Low Bit Rate Communication Systems," John Wiley & Sons, 1995. The LSF coefficients may be denoted by $$\{LSF(n), n=0,1,\ldots P\} \quad (10)$$

The functions of the tone acceptance module 208 may be implemented using a set of computer instructions stored in a memory and executed by a processor. The tone acceptance module 208 may determine whether there are two roots of the LSF transform near the initial tone.

The frequencies relating to the LSF coefficients may be compared against the DTMF tone frequencies (determined by the pattern-matching module 218). If the LSF coefficients determined by the LSF analysis module 206 have frequencies which are closest to the frequencies in the frequency pair identified by the pattern matching module 218, then the DTMF tone is registered, otherwise, the tone is rejected.

In one example, the digit "1" is pre-selected by the pattern matching module 218. For this tone, the two corresponding frequencies are 697 Hz and 1209 Hz. If digit "1" is the real input signal, there should be two LSF coefficients having frequencies closer, by an offset, to 697 and 1209 Hz, then any other frequencies. The offset may be 40 Hz, for example. If the determination as two whether the LSF coefficients are closest to the corresponding frequencies (697 Hz and 1209 Hz) is affirmative, then the tone is accepted. In this case, the acceptance lead 219 indicates that the tone is accepted.

On the other hand, if digit "1" is not the real input signal, there should not be two LSF coefficients whose corresponding frequencies are closer to 697 and 1209 Hz at the same time. In this case, the rejection lead 221 indicates that the tone has been rejected.

The data base 212 may be any type of memory used to store information along with any processing functions needed to access, store, manipulate, or process the information. The data base 212 may include vector templates of the auto-correlations of the reference DTMF signal $R_{ref}^k$ and their LPC coefficients correlations $C_{ref}^k$. The vector templates for the auto-correlation coefficients of the DTMF signal $R_{ref}^k(n)$ may be calculated using equation (1) while vector templates of the auto correlation coefficients of the LPC coefficients $C_{ref}^k$ may be calculated using:

$$C_{ref}^k(n) = \sum_{j=0}^{P-n} a_k(j)a_k(n-j), \quad n = 0, 1, \ldots, P \quad (11)$$

where $a_k(j)$ are LPC coefficients and $a_k(0)=1$ and index k represents the $k^{th}$ vector template.

The functions of the likelihood ratio determination module 214 may be implemented by combinations of computer instructions stored in a memory and executed by a processor.

When a data sequence $\{x(n)\}$ passes through a linear predictor A(z), the minimum predictive error or residual energy $\alpha$, is given by $$\alpha = \int_{-\pi}^{\pi} |A(e^{j\theta})|^2 |X(e^{j\theta})|^2 \frac{d\theta}{2\pi} \quad (12)$$

If the sequence $\{x(n)\}$ is passed through A'(z), the residual energy $\delta$ will be given by $$\delta = \int_{-\pi}^{\pi} |A'(e^{j\theta})|^2 |X(e^{j\theta})|^2 \frac{d\theta}{2\pi} \quad (13)$$

If a sequence passes through the reference model A(z), which was modeled from original signal $x_{in}(n)$ or passes through the test model A'(z), which was modeled from reconstructed signal $x_{out}(n)$, the ratio of the two residual energies $\alpha/\delta$ ("the likelihood ratio") defines a difference between the reference and test spectra.

The values of $\alpha$ and $\delta$ may be calculated through the use of auto-correlation sequence. The minimal residual error, $\alpha$, can then be computed from $$\alpha = \sum_{n=-M}^{M} C_x(n) R_x(n) \quad (14)$$

$$\delta = \sum_{n=-M}^{M} C'_x(n) R_x(n) \quad (15)$$

where $\{C_x(n)\}$ and $\{C'_x(n)\}$ denote the auto-correlation sequence for the coefficients of the polynomial A(z) and the A'(z), respectively, and $R_x(n)$ is defined as the auto-correlation sequence for the values of $\{x(n)\}$. M is a number whose typical value may be P or 2P.

The likelihood ratio determination module 214 determines values of $\beta_{refx}^k$ and $\alpha_x^0$ using equations (14) and (15). In this part, all the signal auto correlations (reference and current input signal) are used to convolve with the $C_x(n)$, LPC coefficients auto correlation of the current input signal. These $\beta_{refx}^k$ and $\alpha_x^0$ values may provide the information how the reference templates resemble the current LPC model. These values are passed on to the pattern-matching module 218.

The likelihood ratio determination module 214 also determines values of $\beta_{refx}^k$ and $\alpha_{ref}^k$ using equations (14) and (15). In this part, all the signal auto correlations (reference and current input signal) are used to convolve with the $C_{ref}^k(n)$–LPC coefficients auto correlation of the reference signal. These $\beta_{refx}^k$ and $\alpha_{ref}^k$ values may provide the information how the current input signal resembles the reference LPC models. These values are passed on to the pattern-matching module 218.

The functions of the pattern-matching module 218 may be performed by a set of computer instructions stored in memory and executed by a processor. The pattern-matching module 218 determines an initial tone using the likelihood ratios supplied to the pattern-matching module 218 by the likelihood ratio determination module 214 and the database 212.

For instance, the pattern-matching module 218 receives sixteen $\beta_{xref}^k$ and sixteen $\alpha_{xref}^k$ values from the database 218 and determines sixteen $$\frac{\beta_{xref}^k}{\alpha_{xref}^k}$$

values. The pattern-matching module 218 compares these ratios and finds a first minimum ratio value. The pattern-matching module 218 also receives sixteen $\beta_{xref}^k$ and one $\alpha_x^0$ value and determines sixteen $$\frac{\beta_{xref}^k}{\alpha_x^0}$$

ratios. The pattern-matching module 218 compares the ratios to find a second minimum ratio value.

If the first and second minimum ratios for both systems relate to the same tone (i.e., tone k is chosen), the tone k is identified. This identified tone may be further checked by comparing both ratios with a pre-set threshold (e.g., pre-threshold=2.0). If the ratios result in different tones being identified the reject line 235 is asserted, representing that a tone can not be determined from the input signal.

If both ratios are lower than a threshold, the digit represented by the tone k will be temporarily registered. Otherwise, the reject line 235 is asserted, representing that a tone can not be determined from the input signal.

The initial tone may be sent over an initial tone line 223 to the tone acceptance module 208 and processed by the tone acceptance module 208 as described elsewhere in this specification.

Referring now to FIG. 2, the data base 212 includes a first auto correlation reference section 234 and a second auto-correlation section 236. The first auto-correlation section 234 is coupled to the likelihood ratio determination section 305 and 307 of FIG. 3. The second auto correlation section 236 is copied to the likelihood ratio determination module 307 of FIG. 3.

The first auto-correlation section 234 may include a set of vector templates. For example, the first auto-correlation section 234 may include 16 vector templates of $\{R_{ref}^k(n),$ k=1,2, ... 16, n=0,1, ... , P$\}$, which are calculated using equation (1). The first auto-correlation section 234 may be implemented with a suitable combination of a memory and a processor executing computer instructions stored in the memory.

The second auto-correlation section 236 may also include a set of vector templates. For example, the second auto-correlation section 236 may include 16 vector templates $\{A_{ref}^k(n), k=1,2, \ldots 16, n=0,1, \ldots, P\}$, which are calculated using equation (2). In order to save computational powers, $\{C_{ref}^k(n), n=(0,1, \ldots P), K=(1, \ldots ,16)\}$ may be stored in the database instead of $\{A_{ref}^k(n), n=(0,1, \ldots P), K=(1, \ldots ,16), B=(0,1, \ldots P)\}$. The second auto-correlation section 236 may be implemented with a suitable combination of a memory and a processor executing computer instructions stored in the memory.

Two training modules may be used to generate the reference templates of $\{R_{ref}^k(n), k=1,2, \ldots 16, n=0,1, \ldots, P\}$ and $\{C_{ref}^k(n), n=(0,1, \ldots P), K=(1, \ldots ,16)\}$. For instance, one training module may be for generating $\{R_{ref}^k(n),$ k=1,2, ... 16, n=0,1, ... , P$\}$ and the other for calculating $\{A_{ref}^k(n), k=1,2, \ldots 16, n=0,1, \ldots, P\}$ and then $\{C_{ref}^k(n),$ n=(0,1, ... P), K=(1, ... ,16)$\}$. The training modules may be implemented to take into account effects such as windowing and whitening. The templates of $\{R_{ref}^k(n),$ k=1,2, ... 16, n=0,1, ... , P$\}$ and $\{C_{ref}^k(n), n=(0,1, \ldots P),$ K=(1, ... ,16)$\}$ may resemble the centroid or temporal averaged data.

Figure 3:
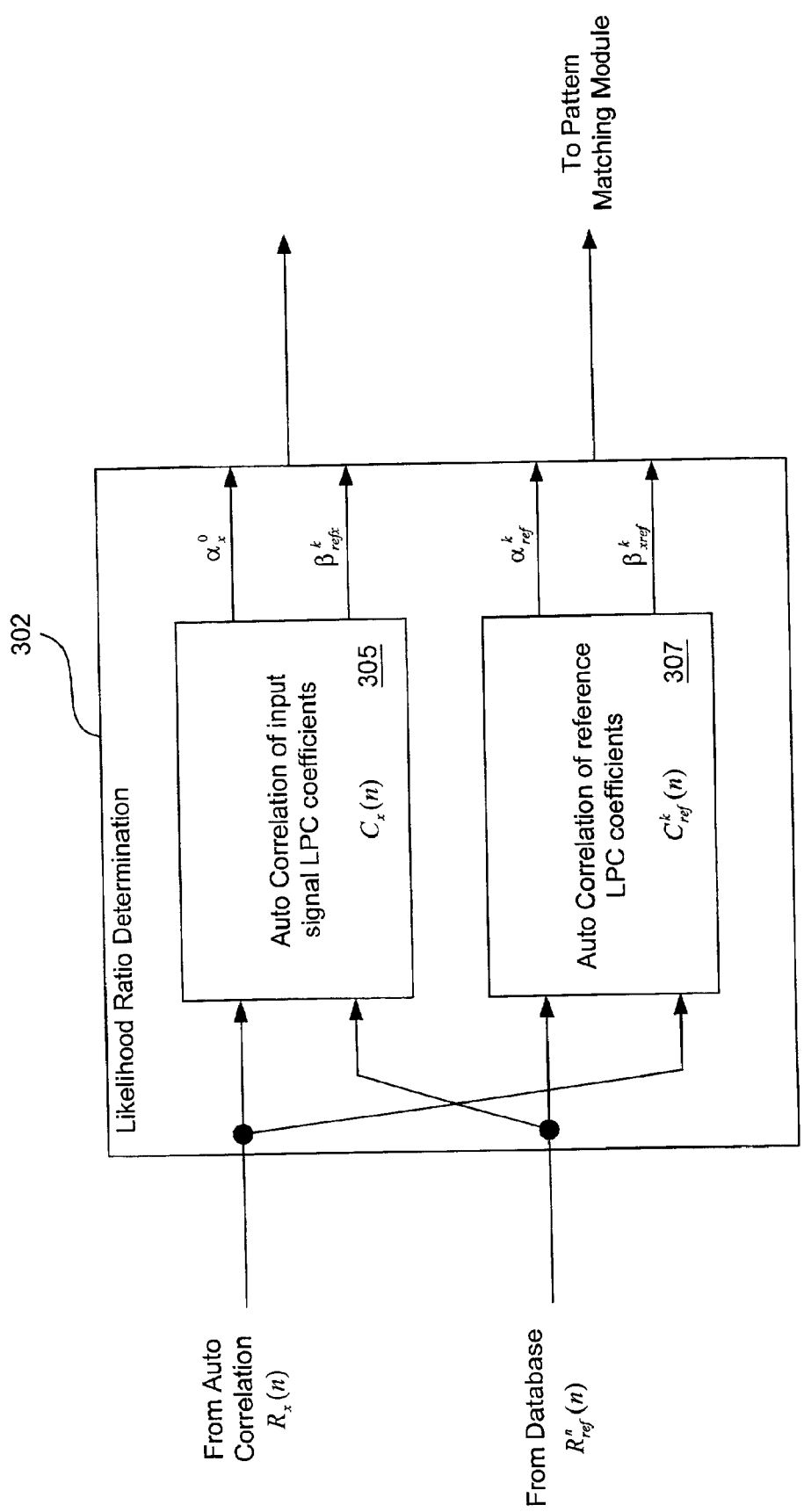
FIG. 3 is a diagram illustrating a calculation of likelihood ratios in accordance with a preferred embodiment of the present invention.

Referring now to FIG. 3, the auto-correlation of current input signal LPC coefficient data 305 is from LPC analysis module 204. The first auto-correlation section 234 is coupled to both 305 and 307 modules. By using equation (15), sixteen $\beta_{refx}^k$ are computed. One value of $\alpha_x^0$ is also computed in module 305 by convolving $R_x(n)$ from Auto correlation module 202 and $C_x(n)$ from LPC analysis module 204. In Module 307, sixteen $\alpha_{xref}^k$ and $\beta_{xref}^k$ are computed using Equation (14) and (15).

Referring now to FIG. 4, the operation of the pattern-matching module is described.

At step 402, the pattern matching module receives the $\beta_{xref}^k$ and sixteen $\alpha_{ref}^k$ values from Likelihood ratio determination module 214. For instance, the pattern-matching module may receive sixteen $\beta_{xref}^k$ and sixteen $\alpha_{ref}^k$ values. At step 404, the pattern-matching module determines the $$\frac{\beta_{xref}^k}{\alpha_{ref}^k}$$

values. At step 406, the pattern matching module compares these ratios and finds a first minimum ratio value and a first tone, which is associated with this ratio.

At step 408, the pattern-matching module receives $\beta_{refx}^k$ and $\alpha_x^0$ values from a likelihood ratio determination module. At step 410, the pattern-matching module determines the $$\frac{\beta_{refx}^k}{\alpha_x^0}$$

ratios. At step 412, the pattern matching module compares the ratios and finds a second minimum ratio value and a second tone, which is associated with the ratio.

At step 414, the pattern-matching module determines if the first and second tones are the same. If the answer at step 414 is negative, then at step 418, a rejection signal is activated to indicate that a tone can not be determined. Execution then ends.

If the answer at step 414 is affirmative, then, at step 416, the pattern matching module determines if the first and second ratios are less than a pre-set threshold (e.g., pre-threshold=2.0). If the answer at step 416 is negative, at step 418 a rejection signal is activated to indicate that a tone can not be determined. Execution then ends.

If the answer at step 416 is affirmative, then, at step 420, the digit represented by the tone k will be temporarily registered. An acceptance line may be activated, for example. Execution then ends. The acceptance line may contain information that indicates the tone ("initial tone"), which may be sent to a tone acceptance module.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for DTMF tones may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for determining a DTMF tone from an input signal, said system comprising:
   a trained data base for storing a plurality of reference templates, at least some of said reference templates representative of likelihood ratios;
   a likelihood ratio determination module coupled to said trained data base, said reference likelihood ratio determination module receiving a plurality of LPC coefficients, said LPC coefficients being representative of an input signal, said likelihood ratio determination module determining a plurality of current likelihood ratios based, at least in part, upon said LPC coefficients;
   a pattern matching module coupled to said trained data base and said likelihood ratio determination module, said pattern matching module determining an initial tone based, at least in part, on the minimum of said current likelihood ratios and the minimum of said reference likelihood ratios; and
   a tone acceptance module coupled to said pattern matching module, said tone acceptance module receiving a plurality of LSF coefficients, said LSF coefficients determined, at least in part, upon said input signal, said tone acceptance module verifying the validity of said initial tone based, at least in part, upon said LSF coefficients.

2. The system of claim 1 wherein said pattern matching module also compares said minimum current ratio to a predetermined threshold.

3. The system of claim 1 wherein there are exactly 16 LPC coefficients.

4. The system of claim 1 wherein there are exactly 16 LSF coefficients.

5. A method for determining a DTMF tone, said method comprising:
   storing a plurality of reference templates, at least some of said reference templates representative of likelihood ratios;
   receiving a plurality of LPC coefficients, said LPC coefficients being representative of an input signal;
   determining a plurality of current likelihood ratios based, at least in part, upon said LPC coefficients;
   determining an initial tone based, at least in part, on the minimum of said current reference likelihood ratios and the minimum of said reference likelihood ratios;
   receiving a plurality of LSF coefficients, said LSF coefficients determined, at least in part, upon said input signal; and
   verifying the validity of said initial tone based, at least in part, upon said LSF coefficients.

6. The method of claim 5 comprising the further step of determining said LPC coefficients.

7. The method of claim 5 comprising the further step of determining said LSF coefficients.

8. The method of claim 5 comprising the further step of transmitting said tone to an outside entity.

9. A system for determining a DTMF tone, said system comprising:
   means for storing a plurality of reference templates, at least some of said reference templates representative of likelihood ratios;
   means for receiving a plurality of LPC coefficients, said LPC coefficients being representative of an input signal;
   means for determining a plurality of current reference likelihood ratios based, at least in part, upon said LPC coefficients;
   means for determining an initial tone based, at least in part, on the minimum of said current likelihood ratios and the minimum of said reference likelihood ratios;
   means for receiving a plurality of LSF coefficients, said LSF coefficients determined, at least in part, upon said input signal; and
   means for verifying the validity of said initial tone based, at least in part, upon said LSF coefficients.

10. A computer program for determining a DTMF tone, said computer program comprising:
    first code for storing a plurality of reference templates, at least some of said reference templates representative of reference likelihood ratios;
    second code for receiving a plurality of LPC coefficients, said LPC coefficients being representative of an input signal;
    third code for determining a plurality of current likelihood ratios based, at least in part, upon said LPC coefficients;
    fourth code for determining an initial tone based, at least in part, on the minimum of said current likelihood ratios and the minimum of said reference likelihood ratios;
    fifth code for receiving a plurality of LSF coefficients, said LSF coefficients determined, at least in part, upon said input signal; and
    sixth code for verifying the validity of said initial tone based, at least in part, upon said LSF coefficients.

11. A computer readable medium having stored therein instructions for causing a processing unit to execute the following method:
    storing a plurality of reference templates, at least some of said reference templates representative of likelihood ratios;
    receiving a plurality of LPC coefficients, said LPC coefficients being representative of an input signal;
    determining a plurality of current likelihood ratios based, at least in part, upon said LPC coefficients;
    determining an initial tone based, at least in part, on the minimum of said current reference likelihood ratios and the minimum of said reference likelihood ratios;
    receiving a plurality of LSF coefficients, said LSF coefficients determined, at least in part, upon said input signal; and
    verifying the validity of said initial tone based, at least in part, upon said LSF coefficients.

12. A method for deterring a DTMF tone comprising:
    receiving an input signal;
    determining the auto-correlates of said input signal;
    determining a plurality of LPC coefficients from said plurality of auto-correlates;
    determining a plurality of LSF coefficients from said plurality of said LPC coefficients;
    determining a plurality of current likelihood ratios using said auto-correlates and said LPC coefficients;
    determining a plurality of reference likelihood ratios;
    determining an initial tone at least in part by using the minimum of said plurality of said current likelihood ratios and said minimum of said plurality of reference likelihood ratios; and confirming the validity of said initial tone at least in part by using said LSF coefficients.

13. The method of claim 12 wherein said step of determining LPC coefficients determines exactly 16 LPC coefficients.

14. The method of claim 12 wherein said step of determining LSF coefficients determines exactly 16 LSF coefficients.

15. A system for determining a DTMF tone, said system comprising:

means for receiving an input signal;

means for determining the auto-correlates of said input signal;

means for determining a plurality of LPC coefficients from said plurality of auto-correlates;

means for determining a plurality of LSF coefficients from said plurality of said LPC coefficients;

means for determining a plurality of current likelihood ratios using said auto-correlates and said LPC coefficients;

means for determining a plurality of reference likelihood ratios; means for determining an initial tone at least in part by using the minimum of said plurality of said current likelihood ratios and said minimum of said plurality of reference likelihood ratios; and means for confirming the validity of said initial tone at least in part by using said LSF coefficients.

16. A computer program for determining a DTMF tone, said computer program comprising:

first code for receiving an input signal;

second code for determining the auto-correlates of said input signal;

third code for determining a plurality of LPC coefficients from said plurality of auto-correlates;

fourth code for determining a plurality of LSF coefficients from said plurality of said LPC coefficients;

fifth code for determining a plurality of current likelihood ratios using said auto-correlates and said LPC coefficients;

sixth code for determining a plurality of reference likelihood ratios;

seventh code for determining an initial tone at least in part by using the minimum of said plurality of said current likelihood ratios and said minimum of said plurality of reference likelihood ratios; and eighth code for confirming the validity of said initial tone at least in part by using said LSF coefficients.

17. A computer readable medium having stored therein instructions for causing a processing unit to execute the following method:

receiving an input signal;

determining the auto-correlates of said input signal;

determining a plurality of LPC coefficients from said plurality of auto-correlates;

determining a plurality of LSF coefficients from said plurality of said LPC coefficients;

determining a plurality of current likelihood ratios using said auto-correlates and said LPC coefficients;

determining a plurality of reference likelihood ratios; determining an initial tone at least in part by using the minimum of said plurality of said current likelihood ratios and said minimum of said plurality of reference likelihood ratios; and confirming the validity of said initial tone at least in part by using said LSF coefficients.

18. A system for determining a DTMF tone, said system comprising:

an auto-correlation module, said auto correlation determining a plurality of auto-correlates for an input signal;

a LPC analysis module coupled to said auto-correlation module, said LPC analysis module determining a plurality of LPC coefficients from said plurality of auto-correlates;

a likelihood ratio determination module for determining a plurality of current likelihood ratios of said LPC coefficients;

a data base coupled to said auto-correlation module and said likelihood ratio determination module, for storing a plurality of reference likelihood ratios;

a pattern matching module for determining an initial tone at least in part by determining the minimum of said plurality of current likelihood ratios and said minimum of said plurality of reference likelihood ratios;

a LSF analysis module coupled to said LPC analysis module for determining a plurality of LSF coefficients from said plurality of LPC coefficients; and a tone acceptance module coupled to said LSF analysis module and said pattern-matching module for verifying the validity of said initial tone using said LSF coefficients.

* * * * *